United States Patent
Kim et al.

(10) Patent No.: US 9,298,341 B2
(45) Date of Patent: Mar. 29, 2016

(54) APPARATUS AND METHOD FOR SWITCHING SPLIT VIEW IN PORTABLE TERMINAL

(71) Applicant: Samsung Electronics Co., Ltd., Gyeonggi-do (KR)

(72) Inventors: Youngri Kim, Gyeonggi-do (KR); Wonkyu Park, Gyeonggi-do (KR); Sungjin Yoon, Gyeonggi-do (KR); Bonghee Han, Gyeonggi-do (KR); Yoojin Hong, Gyeonggi-do (KR); Yujin Lee, Gyeonggi-do (KR); Jihong Jeung, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 192 days.

(21) Appl. No.: 14/026,604

(22) Filed: Sep. 13, 2013

(65) Prior Publication Data

US 2014/0089832 A1 Mar. 27, 2014

(30) Foreign Application Priority Data

Sep. 25, 2012 (KR) .................. 10-2012-0106813

(51) Int. Cl.
*G06F 3/0481* (2013.01)
*G06F 3/0488* (2013.01)
*G06F 3/0486* (2013.01)

(52) U.S. Cl.
CPC ............ *G06F 3/0481* (2013.01); *G06F 3/0486* (2013.01); *G06F 3/04883* (2013.01); *G06F 2203/04803* (2013.01)

(58) Field of Classification Search
CPC .................................................... G06F 3/0486
USPC .......................................................... 715/769
See application file for complete search history.

(56) References Cited

U.S. PATENT DOCUMENTS

| | | | | |
|---|---|---|---|---|
| 8,176,435 | B1 * | 5/2012 | Jitkoff | G06F 3/04883 715/701 |
| 9,037,984 | B2 * | 5/2015 | Park | H04N 5/44591 715/760 |
| 2005/0229154 | A1 * | 10/2005 | Hiew | G06F 8/34 717/110 |
| 2006/0020903 | A1 * | 1/2006 | Wang | G06F 3/0481 715/792 |
| 2006/0218500 | A1 * | 9/2006 | Sauve | G06F 9/4443 715/767 |
| 2006/0294137 | A1 * | 12/2006 | Bryant | G06F 17/30554 |
| 2007/0061702 | A1 * | 3/2007 | Letkeman | G06F 8/71 715/210 |
| 2008/0115064 | A1 * | 5/2008 | Roach | G06F 3/04817 715/730 |
| 2008/0256439 | A1 * | 10/2008 | Boreham | G06F 17/211 715/246 |
| 2009/0019383 | A1 * | 1/2009 | Riley | G06Q 10/10 715/764 |
| 2009/0235186 | A1 * | 9/2009 | Howard | G06F 17/30905 715/760 |
| 2009/0300146 | A1 * | 12/2009 | Park | H04N 5/44591 709/219 |

(Continued)

OTHER PUBLICATIONS

Apple, iPhone user guide, iOs 4.2, released on Mar. 2011.*

*Primary Examiner* — Reza Nabi
(74) *Attorney, Agent, or Firm* — Cha & Reiter, LLC.

(57) ABSTRACT

A method of displaying a view in a portable terminal includes: displaying a plurality of applications as a split view corresponding to a split display region of a display unit; reducing and displaying an application of the split view and switchable candidate applications in a switch mode; displaying an application selected from the candidate applications and changing an application displayed on the split view in a previous state to the candidate application; and enlarging and displaying the split view when the switch mode is terminated.

4 Claims, 20 Drawing Sheets

(56) References Cited

U.S. PATENT DOCUMENTS

| | | | |
|---|---|---|---|
| 2010/0011316 A1* | 1/2010 | Sar | G06F 9/4443 715/784 |
| 2010/0248788 A1* | 9/2010 | Yook et al. | 455/566 |
| 2011/0209057 A1* | 8/2011 | Hinckley | G06F 1/1641 715/702 |
| 2011/0209089 A1* | 8/2011 | Hinckley | G06F 1/1647 715/810 |
| 2011/0209100 A1* | 8/2011 | Hinckley | G06F 3/04883 715/863 |
| 2011/0209101 A1* | 8/2011 | Hinckley | G06F 1/1647 715/863 |
| 2011/0209102 A1* | 8/2011 | Hinckley | G06F 3/0483 715/863 |
| 2011/0209103 A1* | 8/2011 | Hinckley | G06F 3/0416 715/863 |
| 2011/0209104 A1* | 8/2011 | Hinckley | G06F 3/0416 715/863 |
| 2011/0271224 A1* | 11/2011 | Cruz Moreno | G06F 3/0483 715/777 |
| 2012/0081307 A1* | 4/2012 | Sirpal | G06F 1/1616 345/173 |
| 2012/0303548 A1* | 11/2012 | Johnson | G06Q 40/04 705/36 R |
| 2013/0014040 A1* | 1/2013 | Jagannathan | G06Q 50/01 715/765 |
| 2013/0198692 A1* | 8/2013 | Lin | G06F 3/0483 715/835 |
| 2013/0212557 A1* | 8/2013 | Edmunds | G06F 8/75 717/109 |
| 2013/0227396 A1* | 8/2013 | Chinnathambi | G06F 17/212 715/235 |
| 2013/0321340 A1* | 12/2013 | Seo | G06F 1/1641 345/174 |
| 2013/0339830 A1* | 12/2013 | Yuan | G06F 3/017 715/209 |
| 2014/0089831 A1* | 3/2014 | Kim | G06F 3/0481 715/769 |
| 2014/0089832 A1* | 3/2014 | Kim | G06F 3/0481 715/769 |
| 2014/0149931 A1* | 5/2014 | Miki | G06F 9/4443 715/803 |
| 2014/0229872 A1* | 8/2014 | Johnson | G06Q 10/06 715/769 |
| 2014/0325436 A1* | 10/2014 | Kim | H04M 1/72519 715/790 |
| 2014/0351746 A1* | 11/2014 | Evans | G06F 3/0485 715/784 |
| 2015/0067591 A1* | 3/2015 | Nancke-Krogh | G06F 3/0481 715/804 |

* cited by examiner

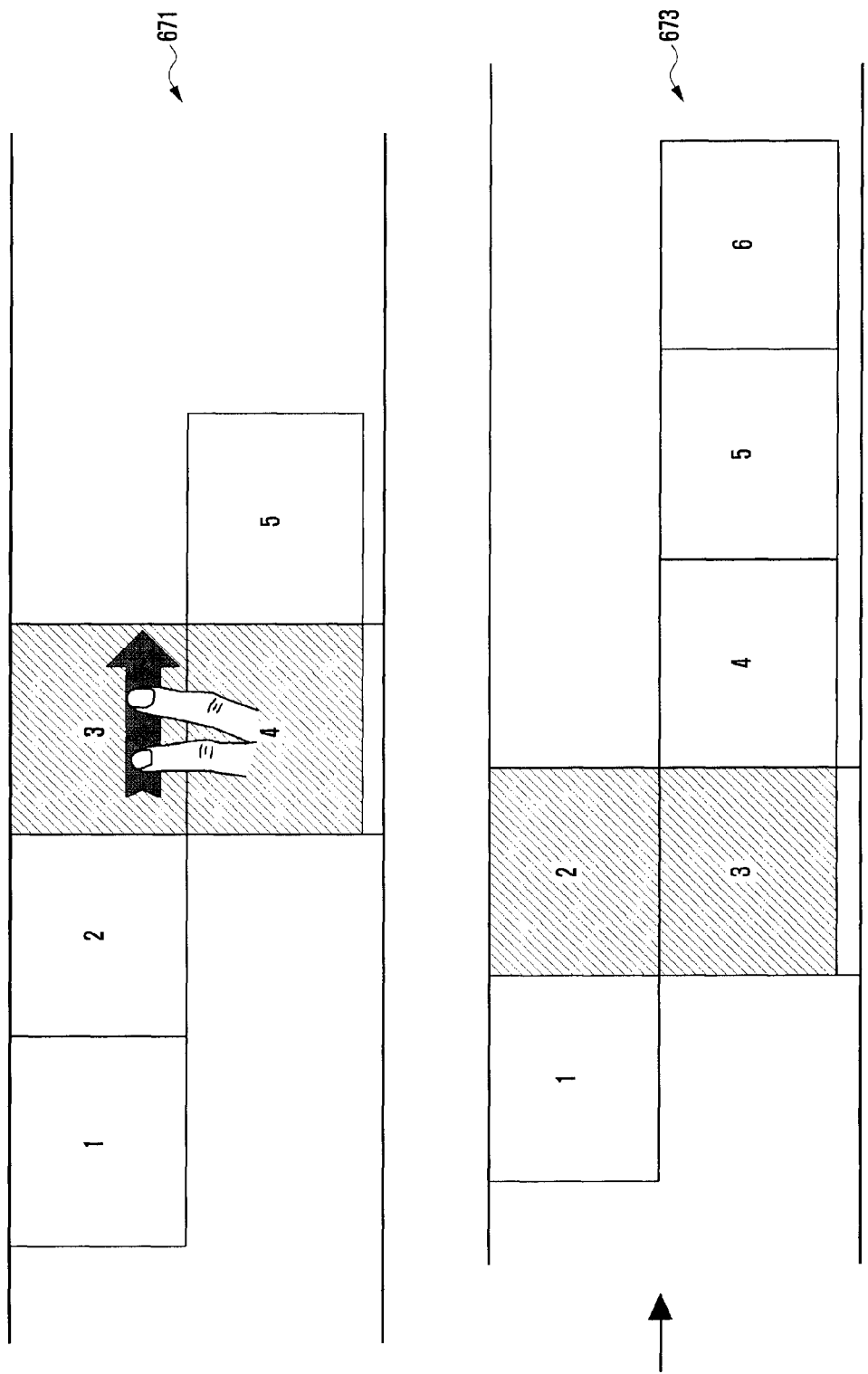

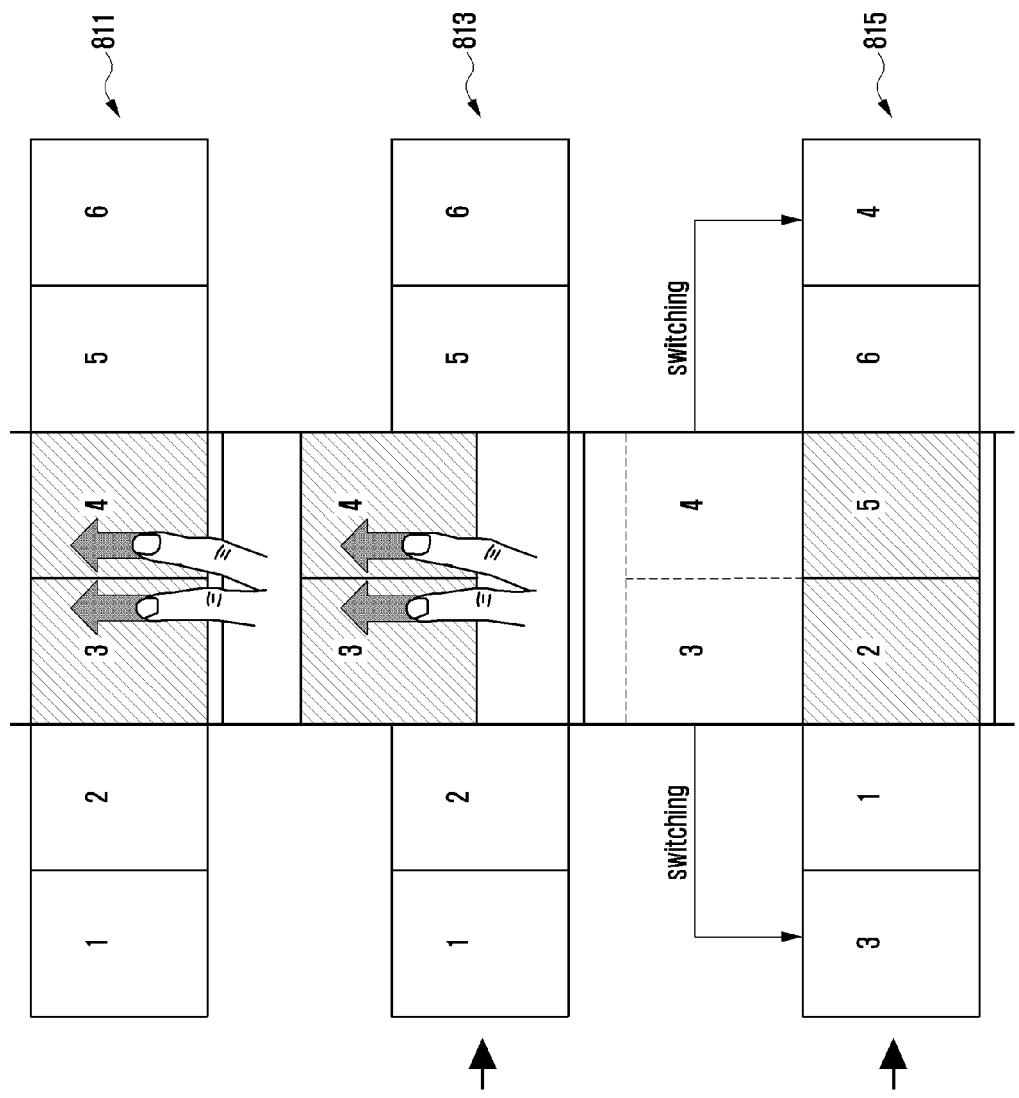

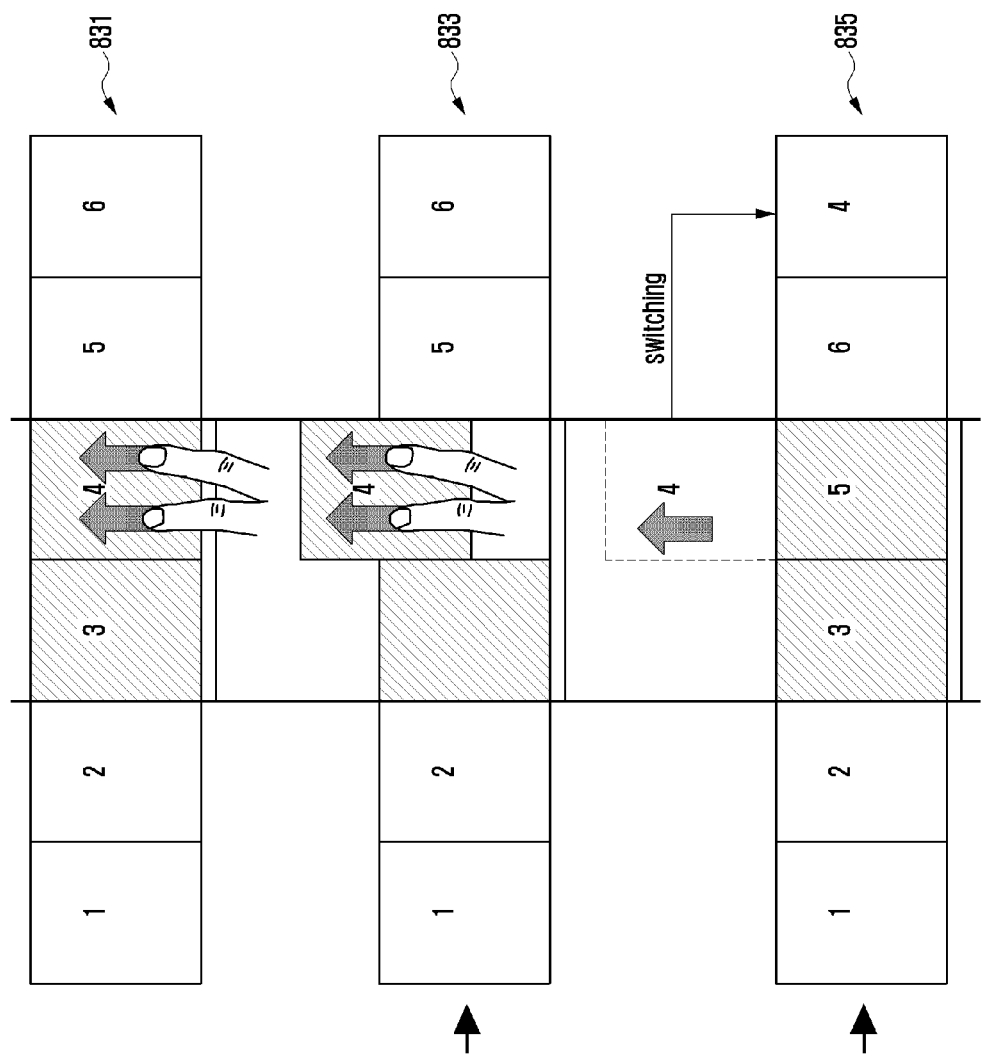

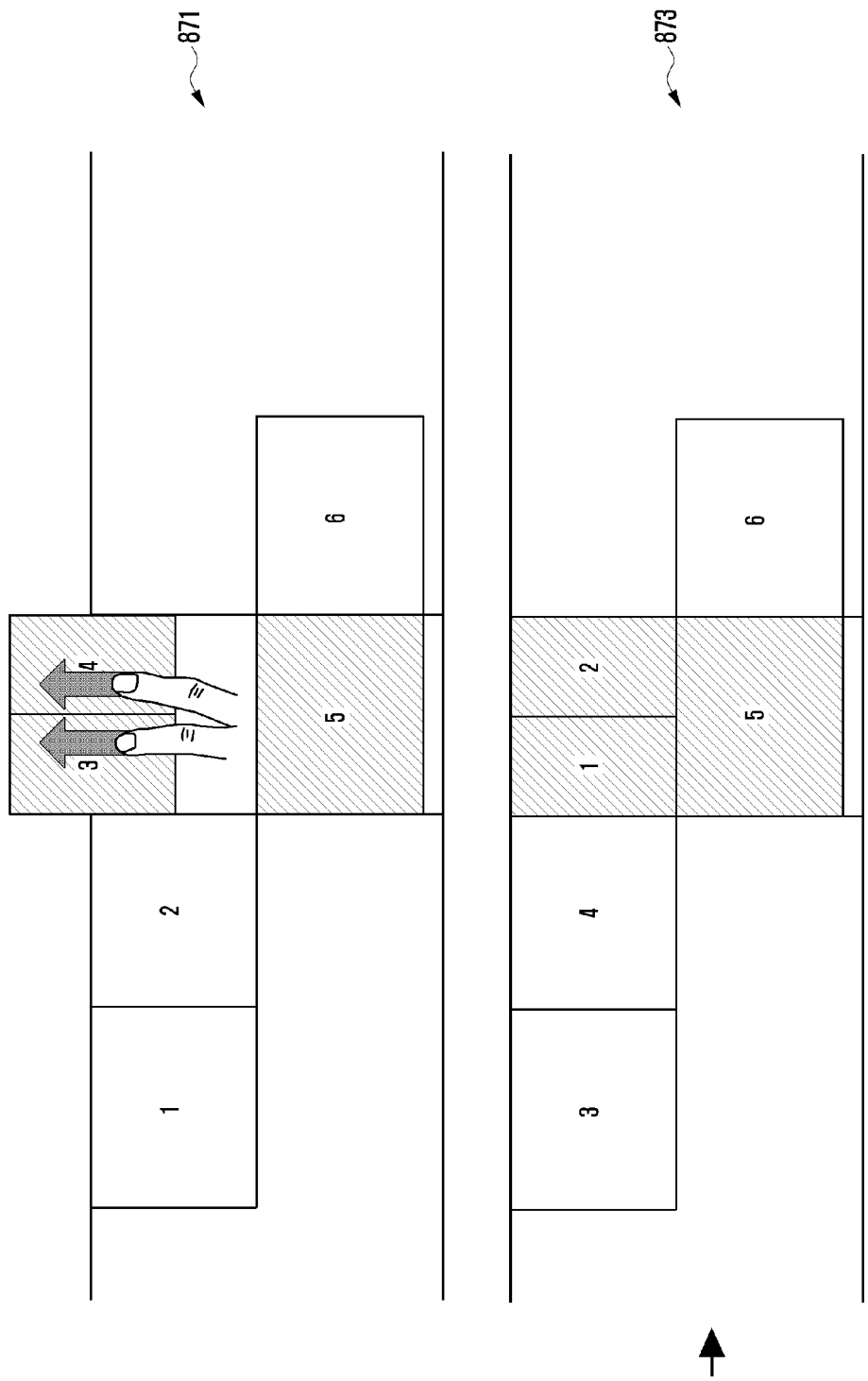

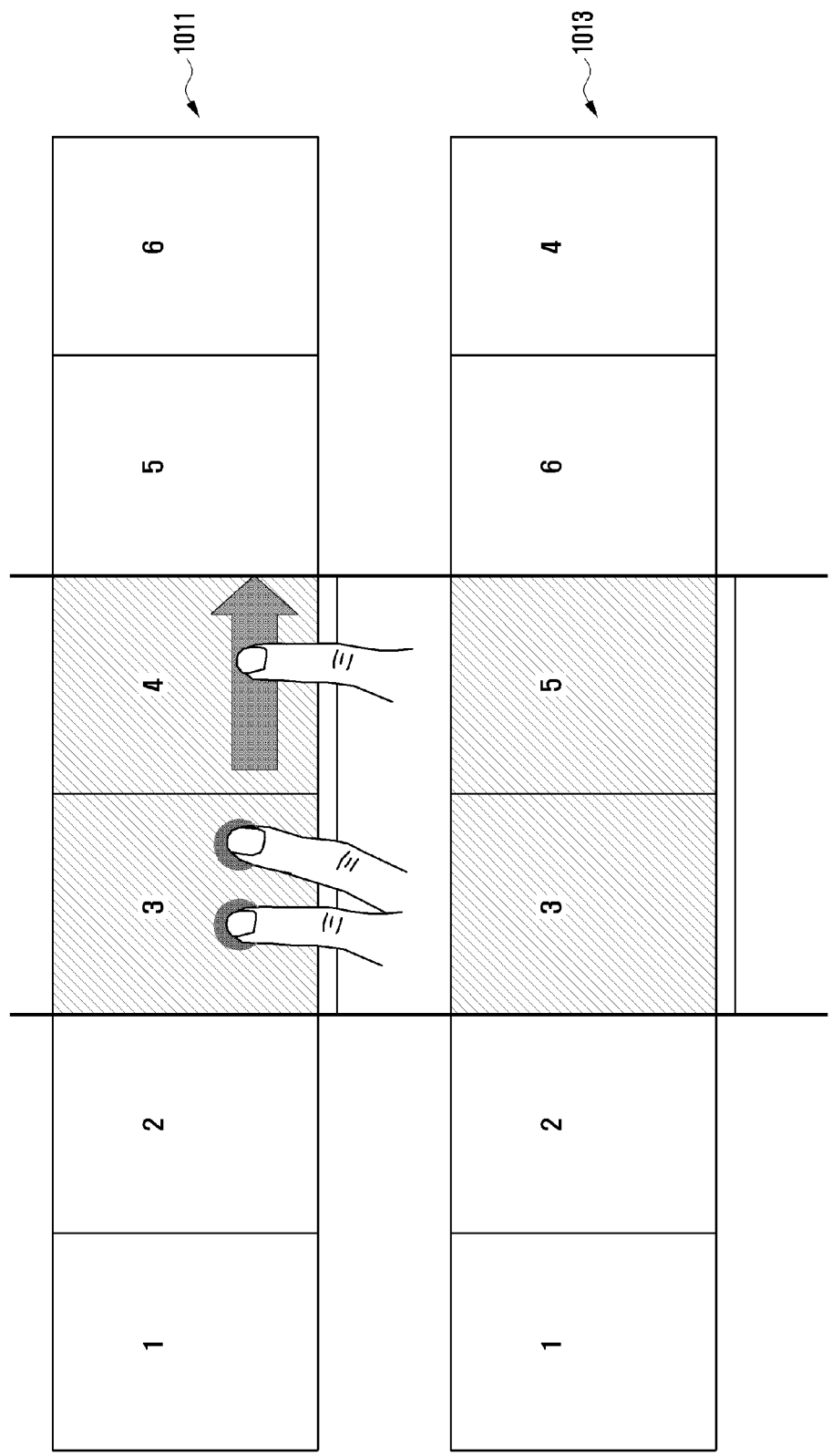

APPARATUS AND METHOD FOR SWITCHING SPLIT VIEW IN PORTABLE TERMINAL

CROSS RELATED APPLICATION

This application claims the benefit of priority under 35 U.S.C. §119(a) of a Korean patent application filed on Sep. 25, 2012 in the Korean Intellectual Property Office and assigned Serial No. 10-2012-0106813, the entire disclosure of which is hereby incorporated by reference.

BACKGROUND

1. Field of the Invention

The present disclosure relates to an apparatus and a method for displaying a plurality of applications as a split view in a portable terminal.

2. Description of the Related Art

In general, a portable terminal may simultaneously process various functions such as communication and multi-media. Further, the portable terminal may process at least two applications. In this case, a method of displaying an application processes applications except for a currently executed application as a background layer. However, in this case, a complex key or touch interaction for executing an application processed as the background must be performed.

Further, a portable terminal performs various functions, and a display unit is gradually enlarged in order to efficiently display multi-media data. In addition, methods of splitting and displaying at least two application views on a display unit have been developed. For example, when displaying two applications as two split views (½ Split view), fixed ½ split forms one view having two applications. In this case, in order to switch applications displayed on two split views to other applications, it is escaped from the split view (½ Split) and then switch between applications must be achieved. Further, a PC-like Free Style window is provided in a format that running applications are accumulated. In order to switch applications to other applications, after a window is removed, a switch between applications must be achieved.

Conventionally, when the portable terminal simultaneously displays a plurality of applications through a split view, in order to achieve switch between applications, a split view (1/N Split window) operated by the user to perform a task cannot be maintained.

SUMMARY

The present invention provides an apparatus capable of switching a displayed application while maintaining a split view in a state that a plurality of applications are simultaneously displayed using the split view in a portable terminal, and a method for operating the apparatus.

In accordance with an aspect of the present invention, a method of displaying a view in a portable terminal includes: displaying a plurality of applications as a split view corresponding to a split display region of a display unit; and switching the active application by changing an application to switchable candidate applications according to a touch interaction when a switch mode is detected, and displaying a neighboring candidate application on the split view.

In accordance with another aspect of the present invention, a method of displaying a view in a portable terminal includes: displaying a plurality of applications as a split view corresponding to a split display region of a display unit; reducing and displaying an application of the split view and switchable candidate applications in a switch mode; displaying an application selected from the candidate applications and changing an application displayed on the split view in a previous state to the candidate application; and enlarging and displaying the split view when the switch mode is terminated.

In accordance with still another aspect of the present invention, an apparatus for displaying a view in a portable terminal includes: a display unit capable of displaying a plurality of applications as a split view corresponding to a split display region of the display unit; an input unit generating a switch mode and an application selection signal; and a controller performing an application switch operation by changing an application to switchable candidate applications according to a touch interaction when the switch mode is detected, and displaying a neighboring candidate application on the split view.

BRIEF DESCRIPTION OF THE DRAWINGS

The above features and advantages of the present invention will be more apparent from the following detailed description in conjunction with the accompanying drawings, in which:

FIGS. 6A, 6B, 6C, 6D and 6E are diagrams illustrating an example of switching an application while performing the method of FIG. 5;

FIGS. 8A, 8B, 8C and 8D are diagrams illustrating an example of switching an application while performing the method of FIG. 7;

FIGS. 10A and 10B are diagrams illustrating an example of switching an application while performing the method of FIG. 9;

DETAILED DESCRIPTION

Exemplary embodiments of the present invention are described with reference to the accompanying drawings in detail. The same reference numbers are used throughout the drawings to refer to the same or like parts. For the purposes of clarity and simplicity, detailed descriptions of well-known functions and structures incorporated herein may be omitted to avoid obscuring the subject matter of the present invention.

The portable terminal according to the embodiment of the present invention may configure and display at least two applications as spit views, and may change an execution function of an application in a state that view split maintains. Execution of the application may be changed using touch and gesture interaction, and a plurality of execution functions may be changed simultaneously. Further, the execution of the application may be changed through entering a mode further showing a plurality of functions in a state that view split maintains.

As used herein, the term "split view" refers to a view displayed on one layer by splitting a plurality of (at least 2) applications. For example, the display can be divided into multiple sections, each section capable to displaying an actively running application. As user herein, the term "touch interaction" refers to a hand (or finger) touch input and a pen touch input generated in a first input unit 140 or a second input unit 150 by a user. Hereinafter, the terms "application" and App may be interchangeable.

Figure 1:
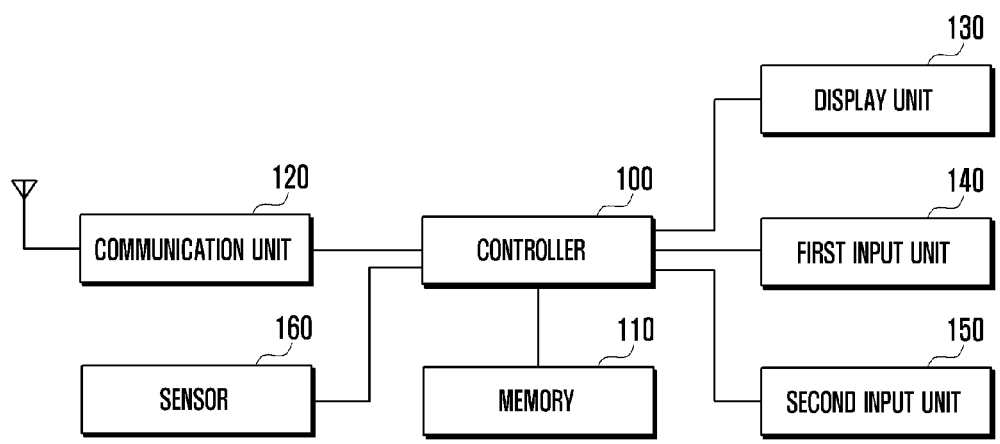
FIG. 1 is a block diagram illustrating a configuration of a portable terminal according to an exemplary embodiment of the present invention.

FIG. 1 is a block diagram illustrating a configuration of a portable terminal according to one exemplary embodiment of the present invention. The portable terminal may include various digital devices such as a portable phone with a smart phone, an MP3 terminal, a tablet, and a computer. For example, the smart phone may run various applications, including e-mail, Internet, e-book functions, etc. In particular, the portable terminal provides may provide a video call function which transmits or receives and transmits not only the voice, but also the image of the other party. The portable terminal according to an embodiment of the present invention is a mobile electronic device that is easily carried by humans (or mounted in or on a vehicle, such as an automobile or motorcycle), and may include video phones, cellular phones, smart phones, International Mobile Telecommunication-2000 (IM-2000) terminals, Wideband Code Division Multiple Access (WCDMA) terminals, Universal Mobile Telecommunication Service (UMTS) terminals, Personal Digital Assistants (PDAs), Portable Multimedia Players (PMPs), Digital Multimedia Broadcasting (DMB) terminals, E-Books, portable computers (e.g., laptops, tablet PCs, etc.), or digital cameras.

Referring to FIG. 1, a communication unit 120 preferably is capable of performing a wireless communication function with a base station and/or another device. The communication unit 120 may include an RF transmitter for up-converting a frequency of a transmitted signal and amplifying the converted signal, and an RF receiver for low-noise-amplifying a received signal and down-converting the amplified signal. Further, the communication unit 120 may include a modulator and a demodulator. The modulator modulates and transfers a transmitted signal to the transmitter, and the demodulator demodulates a signal received through the receiver. In this case, the modulator and the demodulator may include components capable of communication via any combination of wireless communication schema, for example, LTE, WCDMA, GSM, WIFI, WIBRO, NFC, and Bluetooth. It is assumed in the embodiment of the present invention that the communication unit 120 includes LTE, WIFI, and Bluetooth communication units.

A controller 100 controls an overall operation of the portable device, and may display at least two applications as split views. Further, the controller 100 selects an application for change in a state that a plurality of applications are displayed through the split views, moves the selected application, and controls an operation of switching the moved application to another application. In preferred embodiments the controller 100 contains a processor or microprocessor. A memory 110 may include a program memory for storing an operation program of the portable device and a program according to the embodiment of the present invention, and a data memory for storing tables for operating portable device and data created during execution of a program.

A display unit 130 typically displays information resulting from an executed application under control of the controller 100. The display unit 130 may include any type of conventional display unit, e.g, an LCD or an OLED. The first input unit 140 is typically associated with the display unit 130 and may be implemented by a capacitive type or a resistive type, and outputs location information of user touch (assumed as 'finger touch') are typically fed to the controller 100. A second input unit 150 may include an EMR sensor pad, and detects and outputs a pen touch input to the controller 100. The first input unit 140 and/or the second input unit 150 may generate a touch interaction or command for changing an application of the split view according to a user input. The display unit 130, a touch panel 140, and an ERM panel 150 may be integrally configured.

A sensor 160 typically includes one or more sensors for detecting a location of the portable device. The sensor 160 detects an orientation, e.g., horizontal or vertical, of the portable terminal to generate a display mode detection signal of the display unit 130. More particularly, the controller 100 analyzes an output of the sensor 160. When the portable terminal is positioned vertically, the sensor 160 detects the display mode of the display unit 130 as a portrait mode. When the portable device is positioned horizontally, the sensor 160 detects the display mode of the display unit 130 as a landscape mode. The sensors may include an acceleration sensor, a geomagnetic sensor and/or a position sensor.

Figure 2:
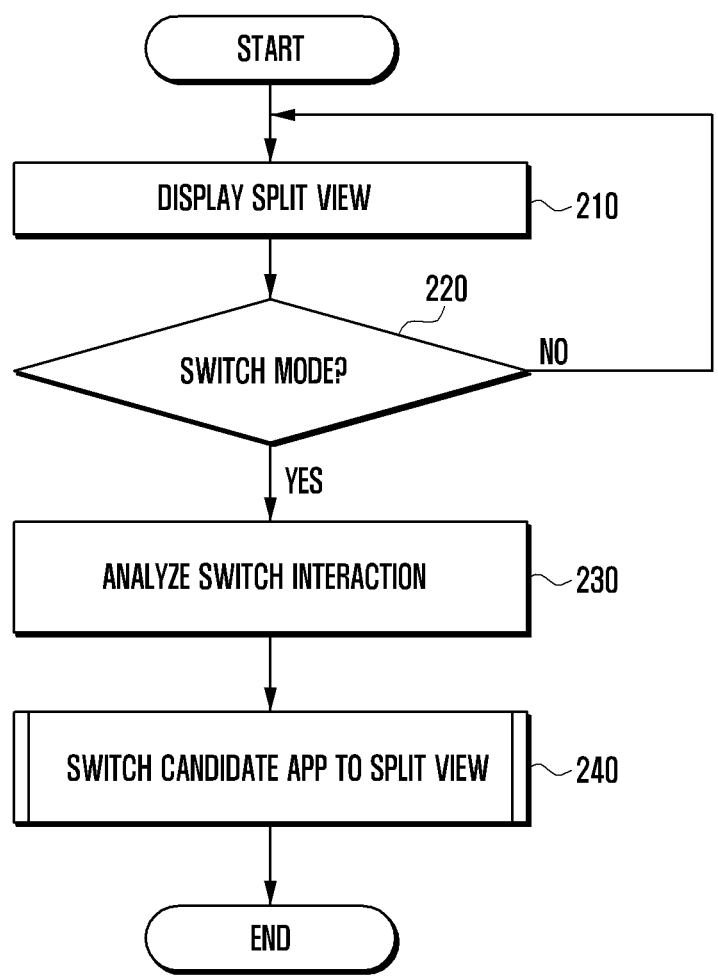
FIG. 2 is a flowchart illustrating a method of switching an application of a split view according to an embodiment of the present invention in a portable terminal capable of displaying a plurality of applications as split views.

FIG. 2 is a flowchart illustrating a method of switching an application of a split view according to one embodiment of the present invention in a portable terminal capable of displaying a plurality of applications as split views.

Referring to FIG. 2, a controller 100 configures and displays a split view for displaying at least two applications on one layer (Step 210).

In this case, the split views display corresponding applications. In this case, the split view displaying a plurality of applications may be set in various forms. Upon configuring the split view, the controller 100 analyzes an output of the sensor 160 to set a split view in a portrait mode or a landscape mode according to an orientation of the portable terminal.

First, the user may select desired Apps from Apps of the portable device to display as a split view. In this case, a mode for selecting the Apps to be displayed as the split view may be provided, and a corresponding mode can be performed by a set touch interaction. In this embodiment the App collection touch interaction is pinch close (whereby multiple contact points on the touch sensor converge). Accordingly, when the user performs a pinch close operation, the first input unit 140 detects the performing of the pinch close operation and outputs a detection result to the controller 100, and the controller 100 detects the performing of the pinch close operation and displays the detection result on the display unit 130. In this case, the Apps displayed on the display unit 130 may include running application, recent application, or a list of available Apps (e.g., applications displayed on a home view). In this manner, if the user selects specific Apps in a state that collection Apps are displayed, the controller 100 may display the selected Apps on the display unit 130 as a split view.

Second, specific Apps may include App switch task information where a switch to another App is necessary. The App switch task information may include Insert/Attach/Link/Preview/Browse. For example, a chatting App (e.g., an application allowing for users of different devices to communicate, preferably in real time) may link with a multi-media App (e.g., gallery application) so that information such as a photograph can be transmitted during chatting. An e-mail App may link with an Internet App (e.g., a browser) according to hyperlink information. Accordingly, if an App having App switch task information is selected, the controller 100 calls an App corresponding to the App switch task information, and then displays the selected App and the App according to the App switch task information on the display unit 130 as a split view. For example, if during an operation of an e-mail App, a user selects a hyperlink, the controller 100 can call an Internet App to display information relating to the hyperlink.

Third, a manufacturing company or a user may display the split view by setting specific Apps. In this case, information on Apps set as display on the split view may be stored in the memory 110 or the controller 100. Further, if a corresponding App is selected, the controller 100 detects that a split view display App is selected and displays Apps set corresponding to the App on the view as the split view. The Apps set by the manufacturing company or the user may include an App (e.g., e-book application) displaying a text, a dictionary App, a map App, a web App, and a note App. The note App is often an App capable of recording a memo or note using a pen or a key pad, and may record information from a user while performing Apps such as a text, a schedule, and/or multi-media.

As described above, the controller may select applications except for applications displayed as split views and display the selected applications on split views, and the applications may be candidate application of a switch target. In this embodiment, the candidate application may include a running application, a recent application, or all applications.

If the user requests App switch through a first input unit 140 and/or a second input unit 150 in a state the split views are displayed, the controller 100 detects the switch request (220), and analyzes a type of the App switch (230). The App switch method may be determined by a touch interaction, and the touch interaction may be performing using a finger (single or multi finger), a pen, or the finger and the pen. More particularly, in the embodiment of the present invention, the App switch method may be set corresponding to a format of the touch interaction, and the user may perform a predetermined touch interaction to perform a desired type of an App switch operation. Such App switch method can be preset in the operating system of the portable terminal or can be set by a user, and can be set as any type of interaction with the first input unit 140 and/or the second input unit 150. Accordingly, the controller 100 analyzes a touch interaction for the App switch method (230), and selects a candidate App corresponding to the analyzed result, and switches the selected candidate App to a split view (240).

The App switch method according to an embodiment of the present invention may include a free switch method of displaying candidate Apps in a switch mode, displaying a selected App on a split view, and moving a previously displayed App to a candidate App, a neighboring App switch method of displaying a candidate App neighboring the selected App and moving a corresponding App to a candidate App, a spacing App switch method of displaying a candidate App neighboring the selected App and moving a corresponding App to a candidate App located at the farthest position away from the selected App, a fixed App switch method of setting a fixed App on a split view and displaying a candidate App on a split view of another App, a switch method by App movement of moving candidate Apps and displaying an App displayed at a movement release time point on the split view, and a switch method between Apps in one screen.

In one embodiment, the candidate App refers to an application to be switched, and the candidate application may include a running App, a recent App, or all Apps of the portable terminal as described above.

First, the following is a method of selecting a desired App through entering an App switch mode to switch App display.

Figure 3:
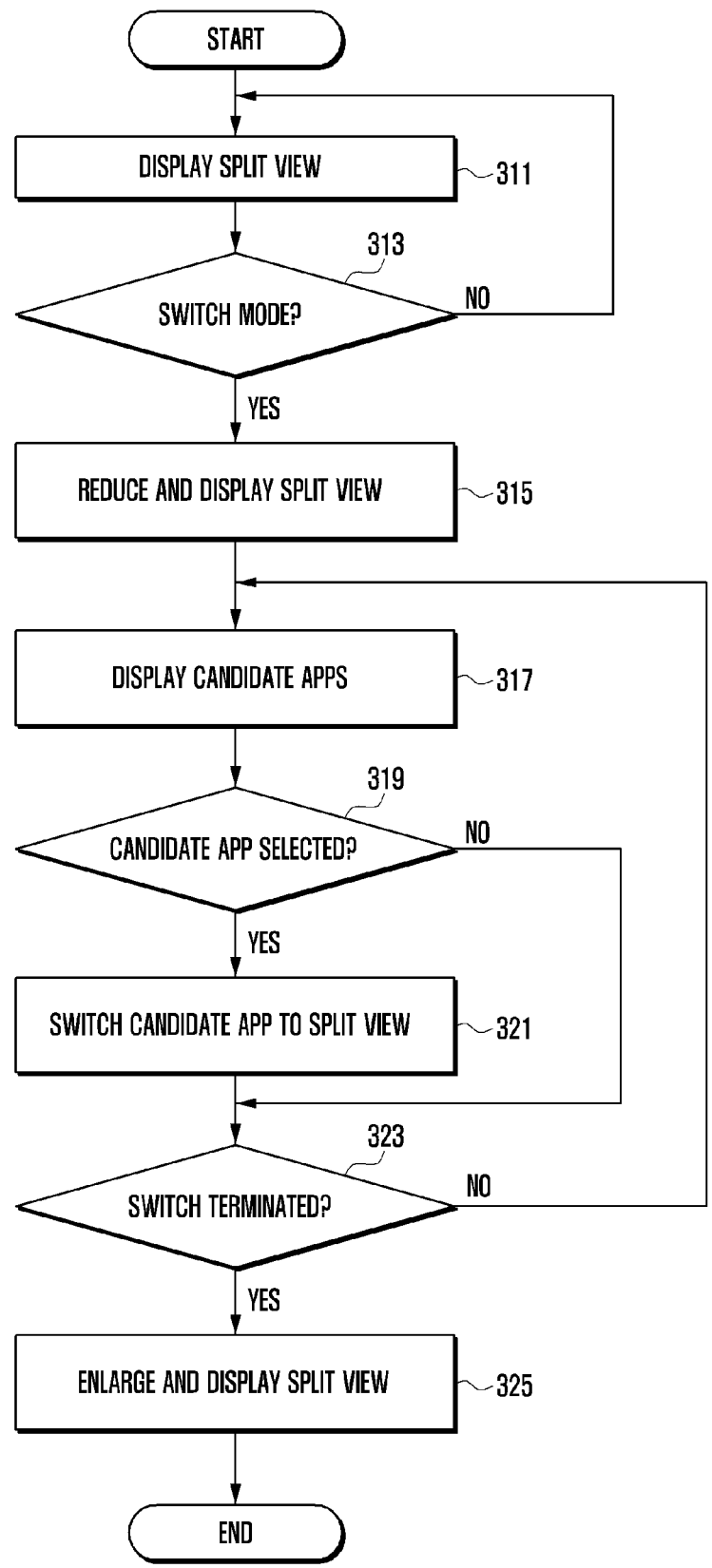
FIG. 3 is a flowchart illustrating a method of selecting and displaying a desired candidate application on a split view through mode entry according to an exemplary embodiment of the present invention.
Figure 4:
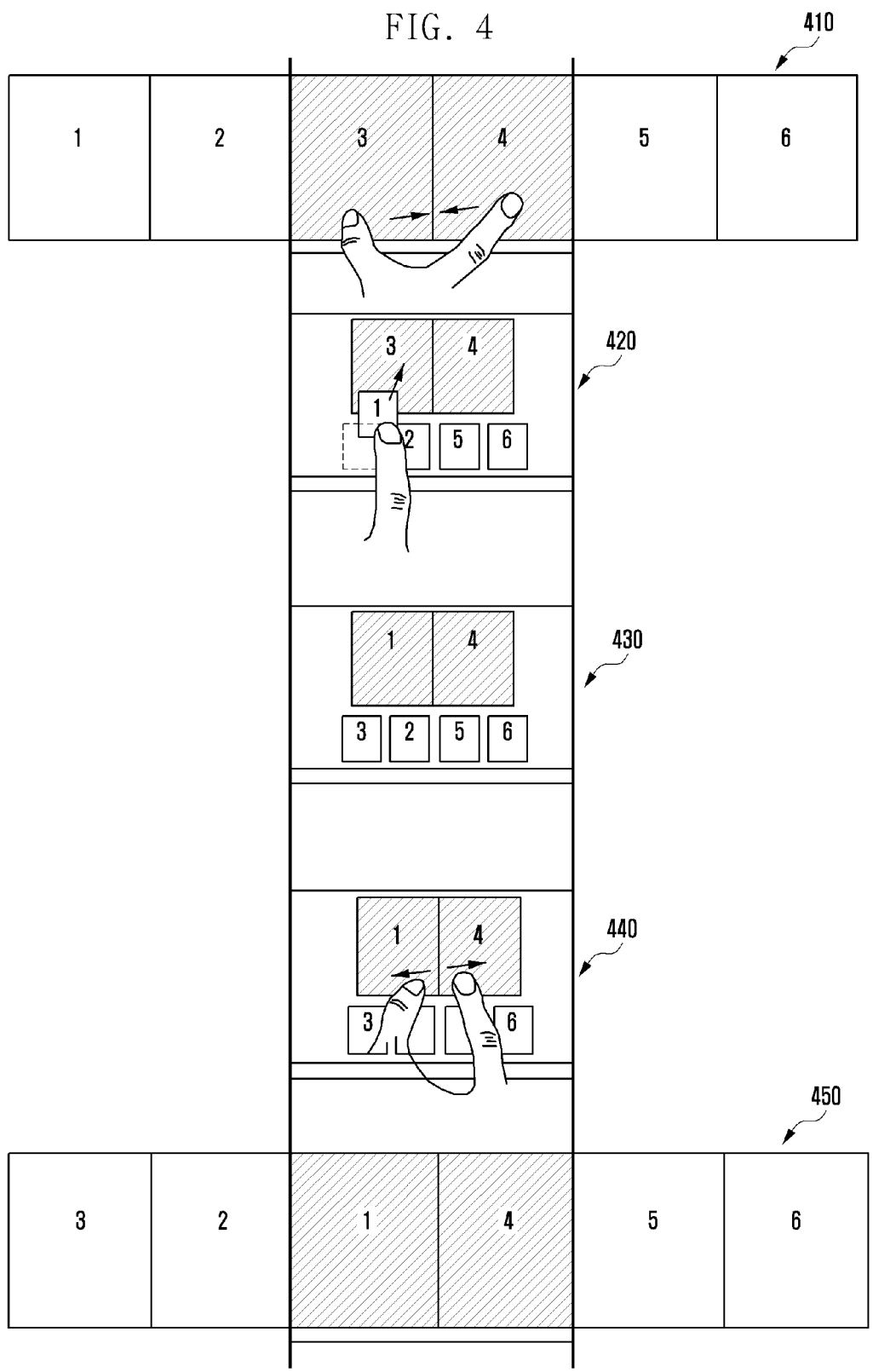
FIG. 4 is a diagram illustrating an example of switching an application while performing the method of FIG. 3.

FIG. 3 is a flowchart illustrating a method of selecting and displaying a desired candidate application on a split view through mode entry according to one exemplary embodiment of the present invention. FIG. 4 is a diagram illustrating an example of switching between applications while performing the method of FIG. 3.

Referring to FIGS. 3 and 4, the controller 100 displays a split view (311) where multiple running applications are simultaneously displayed. As depicted at 410 in FIG. 4, applications 3 and 4 are presently displayed as split views, while applications 1, 2, 5, and 6 are each running candidate applications. As described above, in a state that the split view is displayed, if a user generates an input of a switch mode, the controller 100 switches an application displayed as the split view to a candidate application.

In one embodiment, the touch interaction for switching an application through entering a switch mode is pinch close by a multi-finger. If the user performs a pinch close operation in a when split view is displayed, the controller 100 detects a free switch command (313), and reduces the windows displaying applications 3 and 4 displays, and simultaneously displays each switchable candidate applications 1, 2, 5, and 6 (317). In one embodiment, displayed applications 3 and 4 are each minimized by the same amount, and each of the candidate applications are shown below the running applications, as shown in screen 420. More particularly, if a pinch close operation is detected by multi-finger (at least two fingers), the controller 100 enters a switch mode and controls the display unit 130. If 1/N Split view (split views of applications 3 and 4) maintains, the controller 100 can reduces a display size and displays a switchable App (candidate App) with a small size.

If the user thereafter selects an application (from the candidate applications) to be switched as illustrated in reference numeral 420 (more particularly, if an application of a switch target is dragged and dropped at a desired split view location as illustrated in 420), the controller 100 detects the selected candidate application (319), and switches an application displayed as a split view to a selected candidate application and displays the switched candidate application as illustrated in 430 of FIG. 4 (321). More particularly, in order to replace one running application with one candidate application, the user selects one candidate application and identifies the running application to be replaced. Accordingly, the controller 100 swaps the selected candidate application with the identified displayed application, such that the candidate application becomes a running application and the identified running application becomes a candidate application. In another embodiment, the user can select a candidate application to become an additional running application, i.e., without removing a display application. The controller 100 therefore can reduce the size of the displayed applications to account for the newly displayed application.

As shown in screen 440, if the user terminates the touch interaction to terminate a switch mode operation as illustrated in reference numeral 440, the controller 100 detects termination of the switch mode operation (323), and enlarges a split view of the switched application to an original size and displays the enlarged split view of the switched application on the display unit 130 as illustrated in 450 of FIG. 4 while arranging the candidate application (325). Alternatively, the termination of the switch mode operation can result from the mere passage of time, where the controller 100 detects that the user has not selected a candidate application within a preset period of time.

Referring to FIG. 4, if the user pinch-closes at a split view location by multi-finger in a state that a split view is displayed as illustrated in 410, the controller 100 can reduce a display size while maintaining a shape of a split view displaying applications 3 and 4 on the display unit 130 as illustrated in 420 to display candidate applications 1, 2, 5, and 6. Next, if the user selects, e.g., by dragging, an application 1 to be switched as illustrated in 420, the user can drop the display of the candidate application on top of the location displaying application 3, the controller 100 displays an application on a split view as illustrated in 430 by moving application 3 from its previously displayed application to the location where the candidate applications are displayed. As shown in screen 440, if the user performs a pinch-open, the controller 100 terminates the switch mode and releases the switch mode while displaying applications 1 and 4 as split views as illustrated in 450. The previous application 3 displayed on the split view is moved to a candidate application as illustrated in 450.

FIG. 4 illustrates an example of switching one application, but it is within the scope of the invention to switch all displayed applications as split views to a candidate application. Further, switch of a candidate application may be achieved by freely selecting a candidate application regardless of an order by selection (drag and drop) of the user. FIG. 4 illustrates a landscape mode as one example but the same manner may be performed in a portrait mode. In this case, the candidate application may be vertically displayed and both of portrait and landscape modes may be used.

Figure 5:
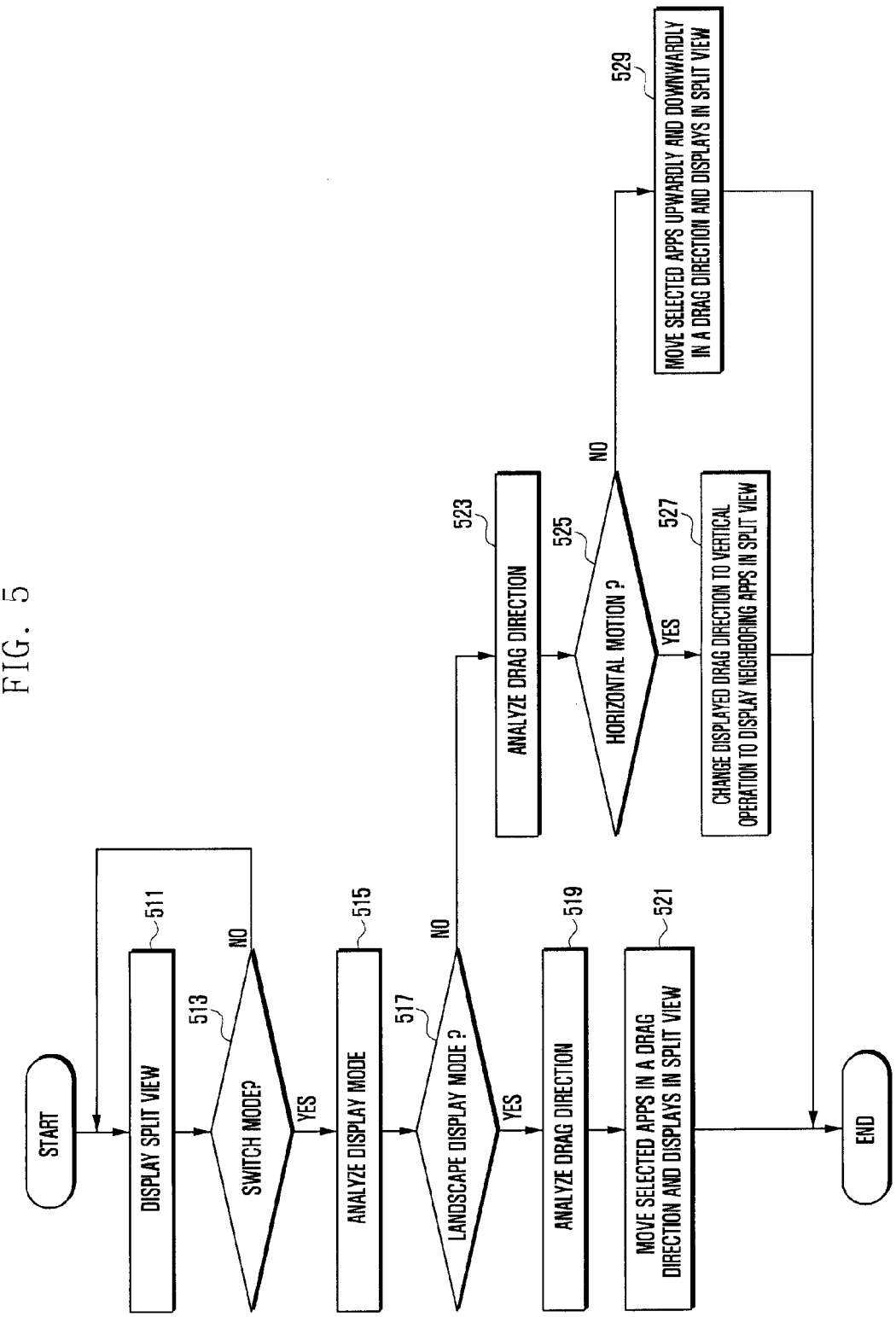
FIG. 5 is a flowchart illustrating a method of switching an App to a neighboring App according to an exemplary embodiment of the present invention.

FIG. 5 is a flowchart illustrating a method of switching an App to a neighboring App according to another exemplary embodiment of the present invention. FIGS. 6A to 6E are diagrams illustrating an example of switching an application while performing the method of FIG. 5.

Referring to FIGS. 5 to 6E, the controller 100 initially displays a split view (Step 511). When the user generates an input of a switch mode, the controller 100 may detect a switch mode (Step 513). The switch mode may be a mode switched to a neighboring App, i.e., an App currently displayed as a neighboring part of the display, and flick or drag by multi-finger. The instruction to switch to the App may be performed by a drag operation by multi-finger, but may be performed by a flick operation by multi-finger, or any other predetermined command. Accordingly, if a mode is a mode switched to a neighboring App at step 513, the controller 100 analyzes a display mode (or currently orientation of the terminal) (515). The display mode may be determined according to an output of the sensor 160. If the display mode is a landscape mode, the controller 100 analyzes a drag direction (step 519), and displays candidate Apps in a drag direction on a display unit 130 (Step 521). The drag direction may be executed from a left side to a right side or from the right side to the left side.

Figure 6A:
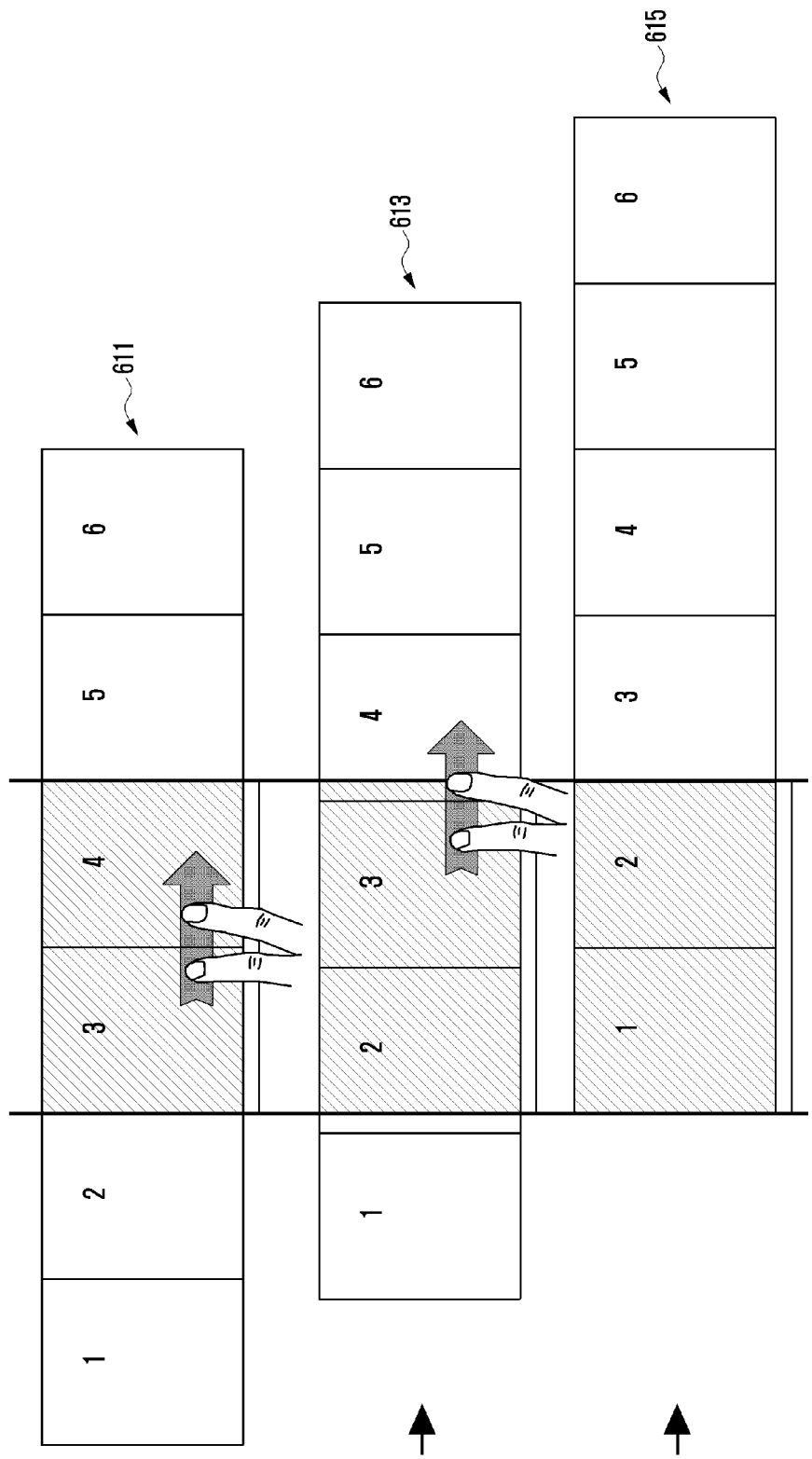
Figure 6B:
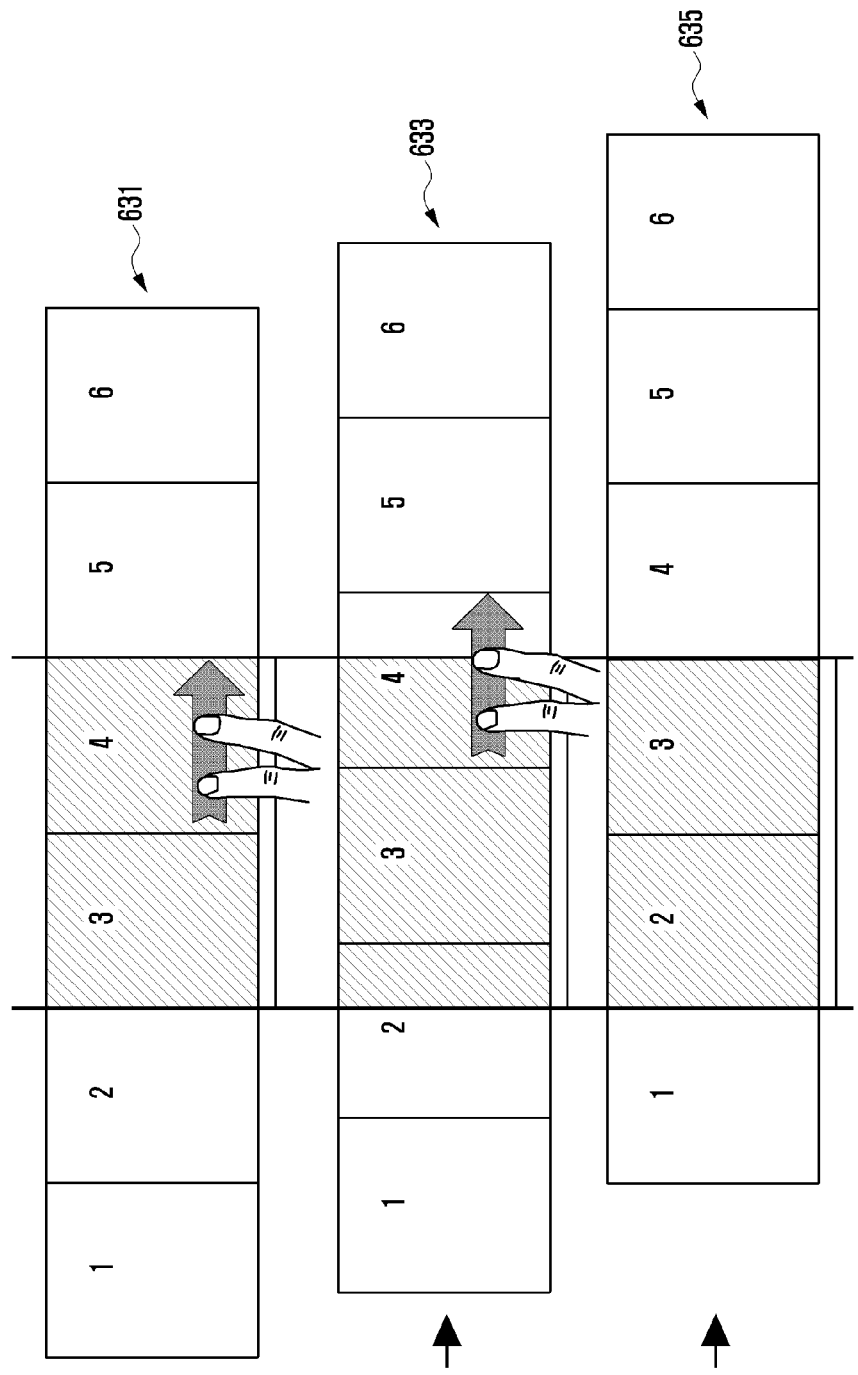

FIGS. 6A and 6B are diagrams illustrating an App switch method in a landscape mode as explained in FIG. 5. In order to switch applications, one more applications may be selected. FIG. 6A illustrates an example of switching two Apps to neighboring Apps or applications utilizing adjacent areas of the display. As shown at step 611 of FIG. 6A, when the user touches and drags two applications, e.g., applications 3 and 4, the controller 100 detects the command and switches to a neighboring App (step 513). The controller 100 then analyzes a display mode (or display orientation) and a drag direction. When the controller 100 detects a drag direction from left to right, the controller 100 detects the drag direction (step 519), and moves Apps 3 and 4, thus replacing displayed applications 3 and 4 with candidate applications 1 and 2 on split views, as shown in screen 615. Preferably, the controller 100 displays applications 2 and 3 (screen 613) as it moves to screen 615. As shown in FIG. 6A, when at least two Apps are switched to select and drag an App region left and right, the controller 100 performs a switch operation which displays neighboring Apps on split views while moving corresponding to the number of selected Apps aside.

FIG. 6B illustrates an example of switching only one App, and an example of switching to a neighboring App by selecting one App, and performs a switch operation in the same method as in FIG. 6A according to one embodiment of the invention. When a user selects one App 4 by a multi-finger (at least two fingers) and drags the App region as illustrated in 631, a selected App 4 is moved aside as illustrated in 633 and is switched to a neighboring new one App 2 as illustrated in 635.

If the display mode is a portrait mode at step 517, the controller 100 analyzes a drag direction (step 523). In this case, when the controller 100 detects a horizontal drag motion (step 525), the controller 100 changes a horizontal drag direction to a vertical operation to display neighboring Apps corresponding to the number of selected Apps on split views (step 527). When the drag direction is a vertical motion, the controller 100 detects the vertical motion (step 525) and displays neighboring Apps corresponding to the number of selected Apps on split views (step 529).

Figure 6C:
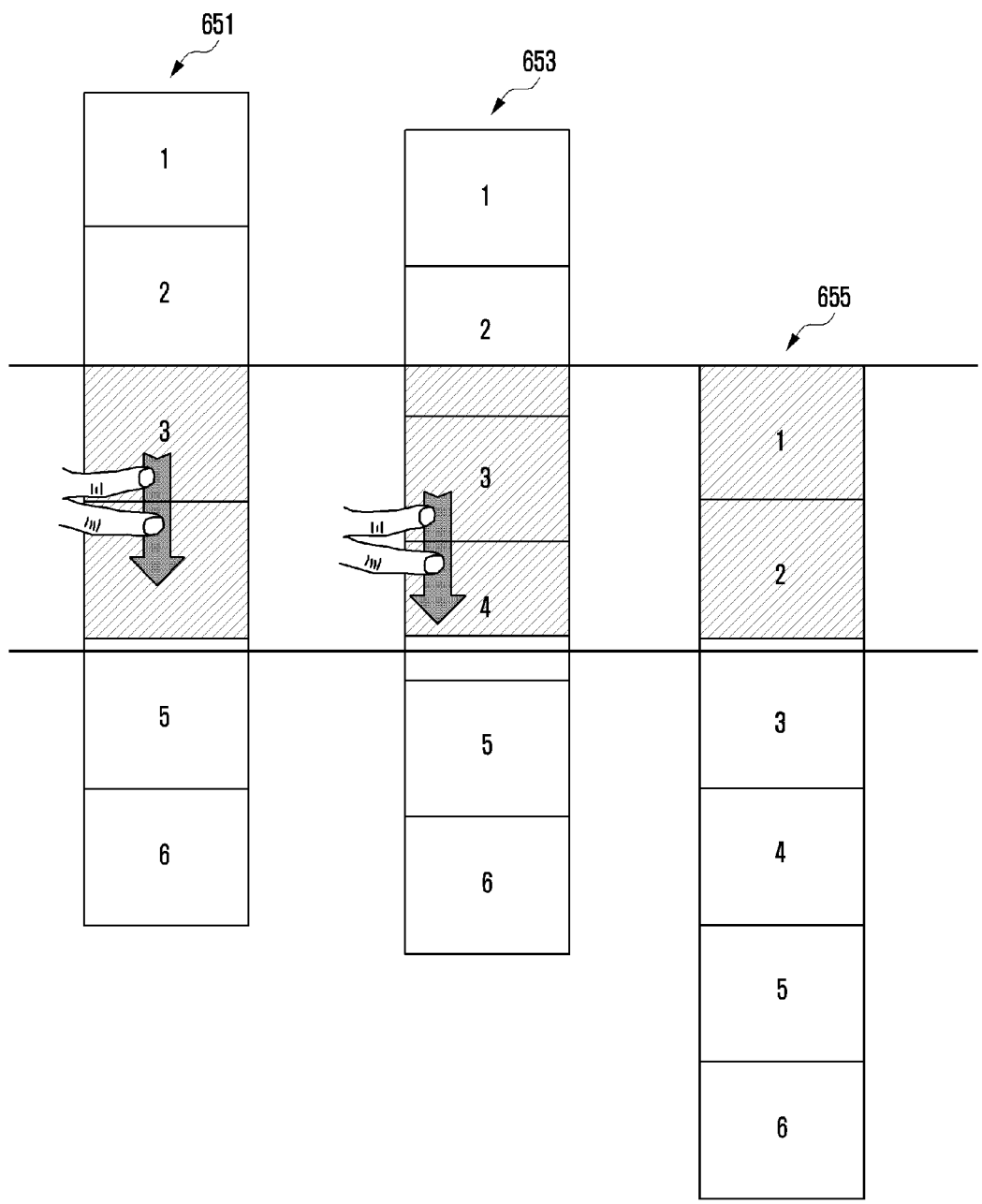

FIGS. 6C to 6E are diagrams illustrating an App switch method in a portrait mode in FIG. 5. When multiple applications are displayed in a split view, one or more applications may be switched. FIG. 6C illustrates an example of dragging two Apps to a selected vertical direction and switching the displayed Apps with neighboring candidate Apps (step 529). As shown in FIG. 6C, when in a vertical orientation, the two displayed Apps to be changed are preferably each selected by a single finger and the selected two Apps are dragged downward. As a result, the display changes from one mode where Apps 3 and 4 are displayed in a split to a mode where Apps 1 and 2 are displayed. As illustrated in FIGS. 6D and 6E, if an App to be changed while a portrait mode (where the display is oriented horizontally) is horizontally dragged, the App is swapped with a neighboring Apps through a drag direction. FIG. 6D is a diagram illustrating one embodiment of dragging App 2 displayed as split views to switch neighboring App 1. Further, FIG. 6E is a diagram illustrating an example of displaying three Apps as split views, which is an example of selecting two Apps 3 and 4 to be changed by a single finger each and dragging the selected Apps to a right side to switch the displayed App to neighboring Apps 1 and 2.

Figure 7:
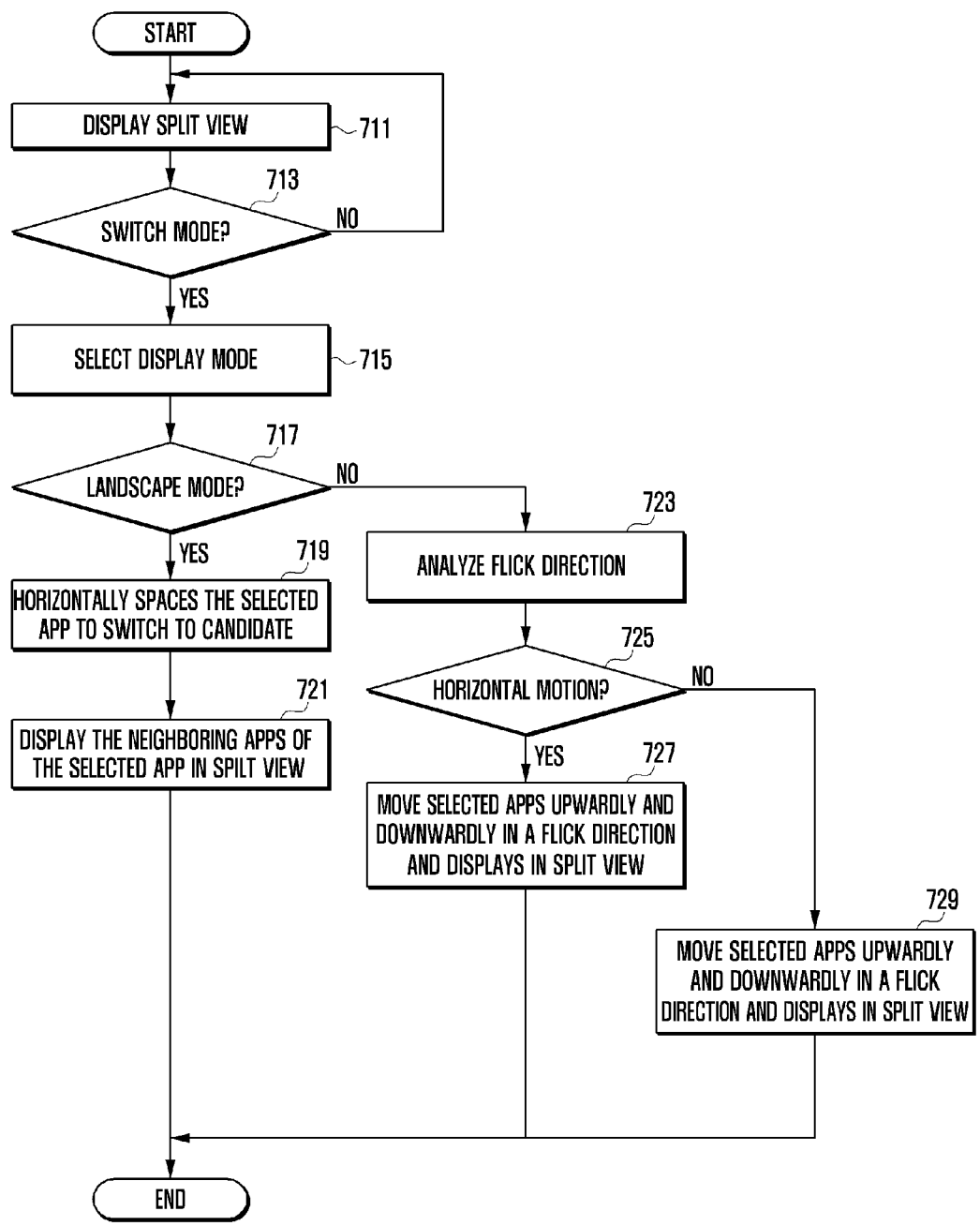
FIG. 7 is a flowchart illustrating a method of switching an App to a distant App according to an exemplary embodiment of the present invention.

Thirdly, a method of switching an App to a distant, that is, spaced or not neighboring App will be described. FIG. 7 is a flowchart illustrating a method of switching an App to a distant App according to one exemplary embodiment of the present invention. FIG. 8A to 8D are diagrams illustrating an example of switching an application while performing the method of FIG. 7.

Referring to FIGS. 7 to 8D, the controller 100 displays a split view (step 711). When the user generates an input of a switch mode in a state that the split view is displayed, the controller 100 detects the switch mode (step 713). The switch mode may be a mode switched to a neighboring App, and flick by multi-finger or any other predetermined gesture or command. Accordingly, if a mode is a mode switched to a neighboring App at step 713, the controller 100 analyzes a display mode (step 715). The display mode may be determined by an output of the sensor 160.

When the display mode is a landscape mode at step 717, the controller 100 horizontally spaces the selected App to move to a distant candidate App (step 719), and swaps the displayed App with the candidate App, and moves the displayed app to neighboring Apps (step 721). In this case, the Apps moved the candidate App are moved both ends of the Apps to be displayed on the split views.

FIGS. 8A and 8B are diagrams illustrating a distant App switch method in a landscape mode in FIG. 7. When an application of the split view is selected to be switched, one or more applications may be switched. Referring to FIG. 8A, when the user flicks an App region up and down with a single finger one each App selected, the selected App or Apps is/are moved by the number of selected Apps upward (or downward) and is filled by the number of Apps in which both Apps are moved to be switched. In this case, the App moved upward or downward is moved to opposite ends of a row displaying the candidate Apps. FIG. 8A illustrates an example of displaying the Apps 3 and 4 and neighboring Apps 2 and 5 on a split view if two Apps 3 and 4 to be changed are selected by each single finger to flick upward. FIG. 8A illustrates an example where the Apps 3 and 4 are moved to a farthest position away from the App displayed on a split view by the above switch operation.

Further, FIG. 8B illustrates an example where the selected Apps are moved upward or downward and switched to candidate Apps upon selected by a multi-finger (at least two fingers) flick upward or downward. More particularly, App 4 and a neighboring App 5 are displayed on a split view and App 4 is moved to a location farthest from the App 5 when selected for changing by a multi-finger (two or more) flick upward.

The controller 100 analyzes a flick direction (step 723) depending upon the display mode (step 717). When the display is in portrait mode and the flick direction is a horizontal motion, the controller 100 detects the flick direction (step 725), and changes the horizontal flick to a vertical operation to move the selected App(s) to the farthest position away from the split view to switch the App to the candidate App, and displays neighboring Apps by the number of candidate Apps on a split view (step 727). If the flick direction is the vertical direction, the controller 100 detects it at step 725, and moves the selected Apps to the farthest position away from the split view to switch the App to a candidate App, and displays neighboring Apps by the number of changed candidate Apps on the split view (step 729).

Figure 8C:
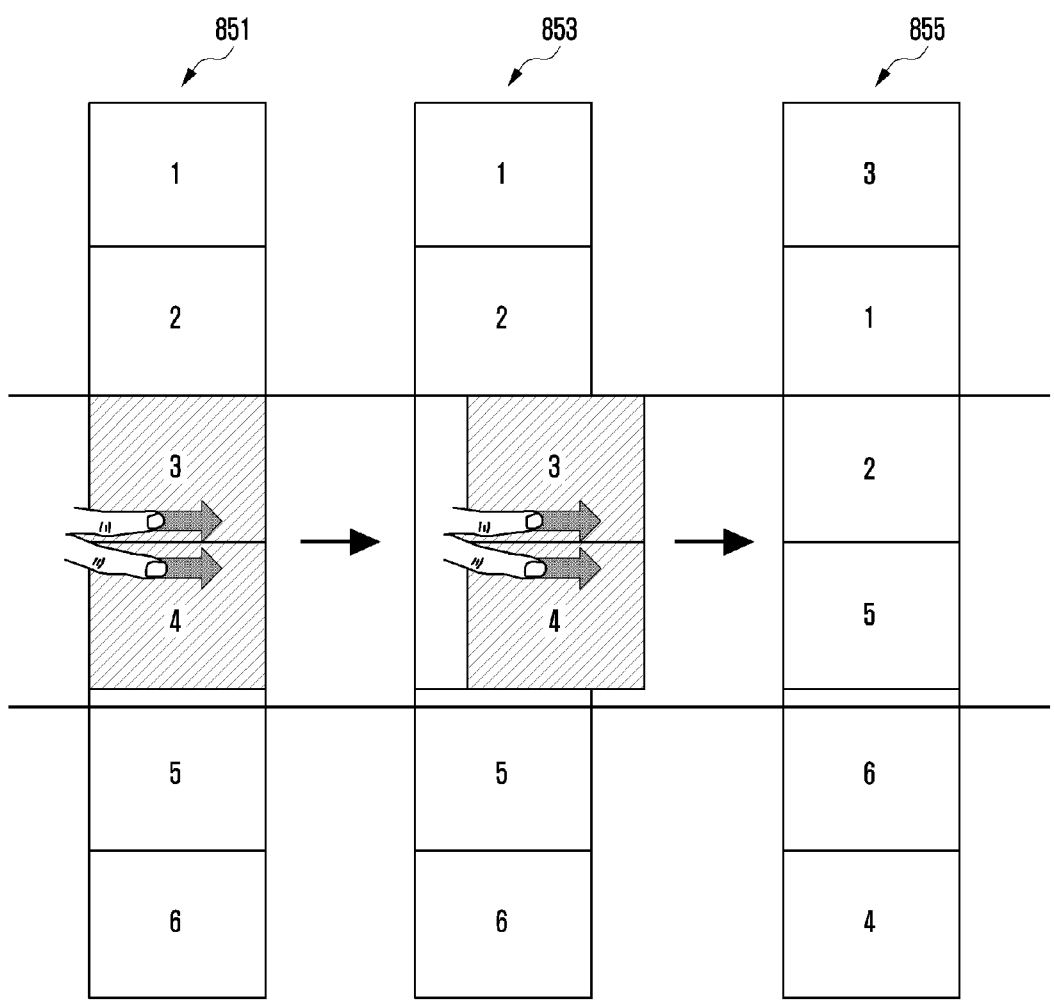

FIGS. 8C and 8D are diagrams illustrating a distant App switch method in a portrait mode of FIG. 7. When an application of the split view is selected, one or more applications may be switched. As shown in FIG. 8C, when the user selects an App region with single finger horizontal flick on each Apps, the App selected is moved by the number of selected Apps in a right direction (or left direction) and is filled by the number of Apps in which both Apps are moved to be switched. More particularly, the App moved in the left direction or the right direction is moved to both ends of the list containing the candidate Apps. FIG. 8C illustrates an example of displaying Apps 3 and 4 and neighboring Apps 2 and 5 on a split view if two Apps 3 and 4 to be changed are selected by each single finger to flick. FIG. 8A illustrates an example where the Apps 3 and 4 is moved to a farthest position away from the App displayed on a split view by the above switch operation.

FIG. 8D is a diagram illustrating an example which maintains a vertical operation in a portrait mode, and displays a vertically split region in a line on a view in a landscape mode. FIG. 8D illustrates an example of displaying three split views, and an example of displaying the Apps 3 and 4 and neighboring Apps 1 and 2 if two Apps 3 and 4 to be changed are selected by each single finger to flick upward.

Figure 9:
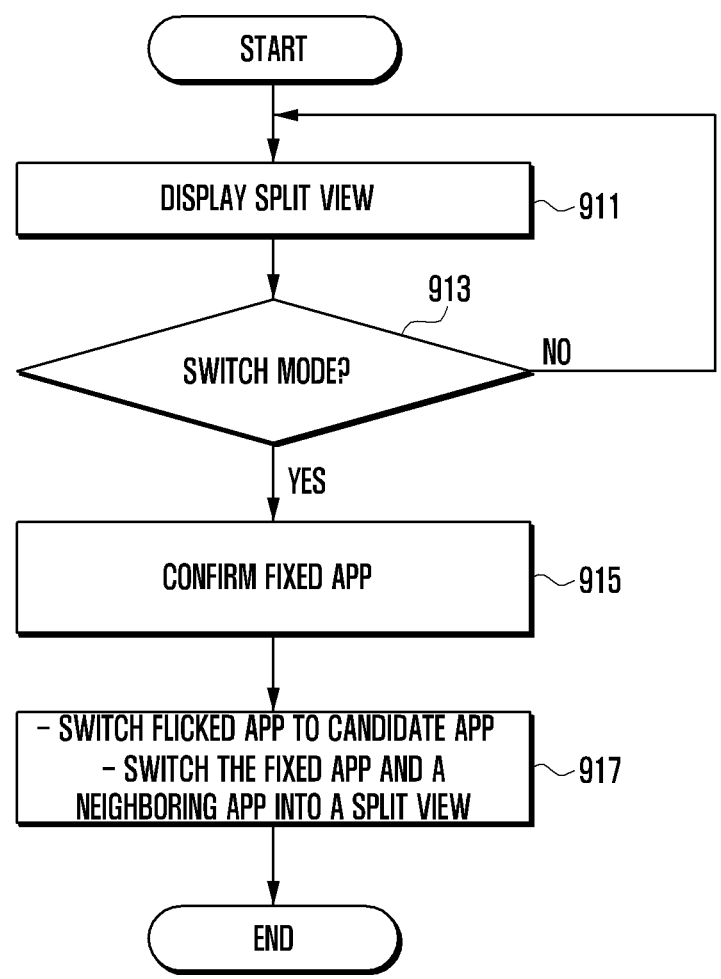
FIG. 9 is a flowchart illustrating a method of setting and switching a fixed App according to an exemplary embodiment of the present invention.
Figure 10B:
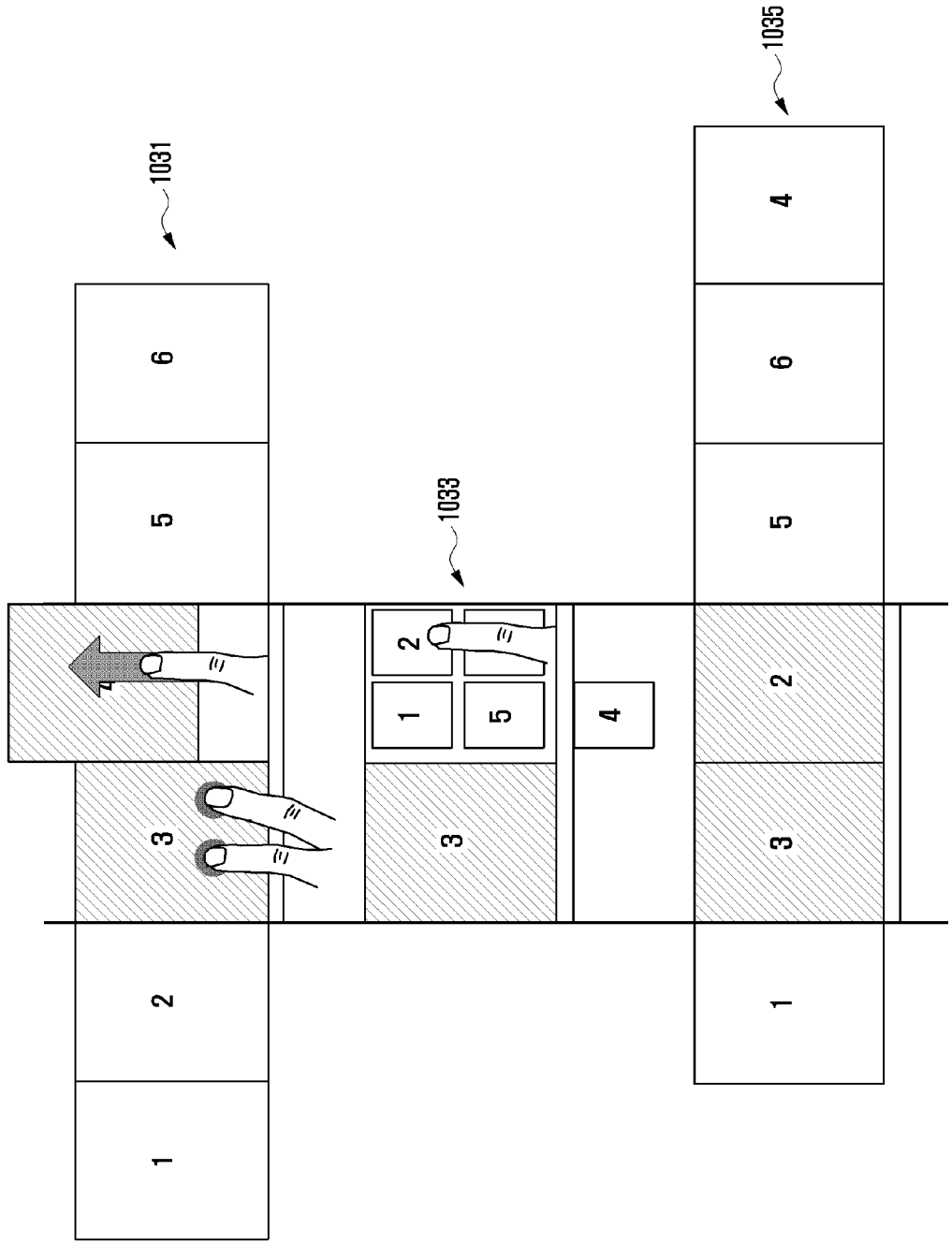

FIG. 9 is a flowchart illustrating a method of setting and switching a fixed App according to one exemplary embodiment of the present invention. FIGS. 10A and 10B are diagrams illustrating an example of switching an application while performing the method of FIG. 9.

Referring to FIGS. 9 to 10b, the controller 100 initially displays a split view (step 911). In this embodiment, if the user generates an input of a switch mode in a state that the split view is displayed, the controller 100 may detect a switch mode (step 913). The switch mode is a mode which sets fixed Apps and switches Apps which are not set. The switch mode may be set by an operation of holding a specific App displayed as a split view and flicking an App of another split view or any other preset gesture or command. Accordingly, if the display mode is a mode which sets and switches a fixed App, the controller 100 confirms a fixed App (step 915), moves a flicked App to a candidate App, and displays the moved candidate App and a neighboring App on a split view (step 917). More particularly, the controller 100 does not perform a switch operation of an App determined as a fixed App, and displays a neighboring App on a split view while changing an App displayed on another split view to a candidate App (step 917).

The method of switching an App by setting the fixed App may be implemented in any number of manners.

FIG. 10A illustrates an example of combining setting a fixed App with the second switch method, and FIG. 10B illustrates an example of combining the setting a fixed App with the firth switch method.

Referring to FIG. 10A, a user typically holds an App to be fixed with one or more fingers and flicks the App to be switches for the purpose of switch as illustrated in 1011 of FIG. 10A. When the user holds (e.g., holds by a multi-finger) App 3, and flicks App 4, App 3 is fixed on a split view as illustrated in 1013, and the App 4 is moved to the farthest position away from a center of a list of candidate Apps, and an App 5 which is initially adjacent to App 4 is displayed on a split view. More particularly, when one App is fixed, as illustrated in FIG. 10A, a fixed App area is selected by a multi-finger (at least two fingers). When an App region which is not selected is flicked left and right, the App is switched to switchable Apps. However, in order to fix at least two Apps, although not shown, an App region is selected by a single finger each. If an App region which is not selected is flicked left and right by a single finger, the App is switched to switchable Apps.

In the portrait mode, the same manner as in the landscape mode may be performed. However, since a view is vertically displayed, a flick direction may be a vertical flick. Further, when a split view is displayed in a portrait mode, but a region vertically split in a screen like a landscape mode is operated as aligned in a line (e.g., case of FIGS. 6D, 6E, and 8D), a fixed App is selected as hold and a flick may be horizontally performed.

Referring to FIG. 10B, in a case of a landscape mode, at least one App can be fixed, by holding the App region can be by a multi-finger (at least two fingers) hold as illustrated in 1031. If an App region which is not selected to be fixed is flicked upward or downward by another finger, a display of candidate Apps is provided, each having a small size as illustrated in 1033. If a candidate App to be switched is tapped as illustrated in 1033, at least two selected Apps become fixed as illustrated in 1035. When a switch operation is performed, an App region for fixing is selected by each single finger. If an App region which is not selected to be fixed is flicked upward or downward by a single finger, the list of candidate Apps is provided having a small size, and a switchable candidate App is elected so that a switch operation may be performed.

In a case of the portrait mode, a method similar to FIG. 10B is performed. However, since a view is vertically displayed, a flick direction may be a vertical flick. Further, when a split view is displayed in a portrait mode, but a region vertically split in a screen like a landscape mode is operated as aligned in a line (e.g., case of FIGS. 6D, 6E, and 8D), a fixed App is selected as hold and a flick may be horizontally performed.

In a case where a switch operation is performed by the method of FIG. 10B, if a fixed App is selected, a multi-finger (at least two fingers) holding a fixed region may be released after entering a fixed mode and a hold state may continuously maintain according to convenience.

Figure 11:
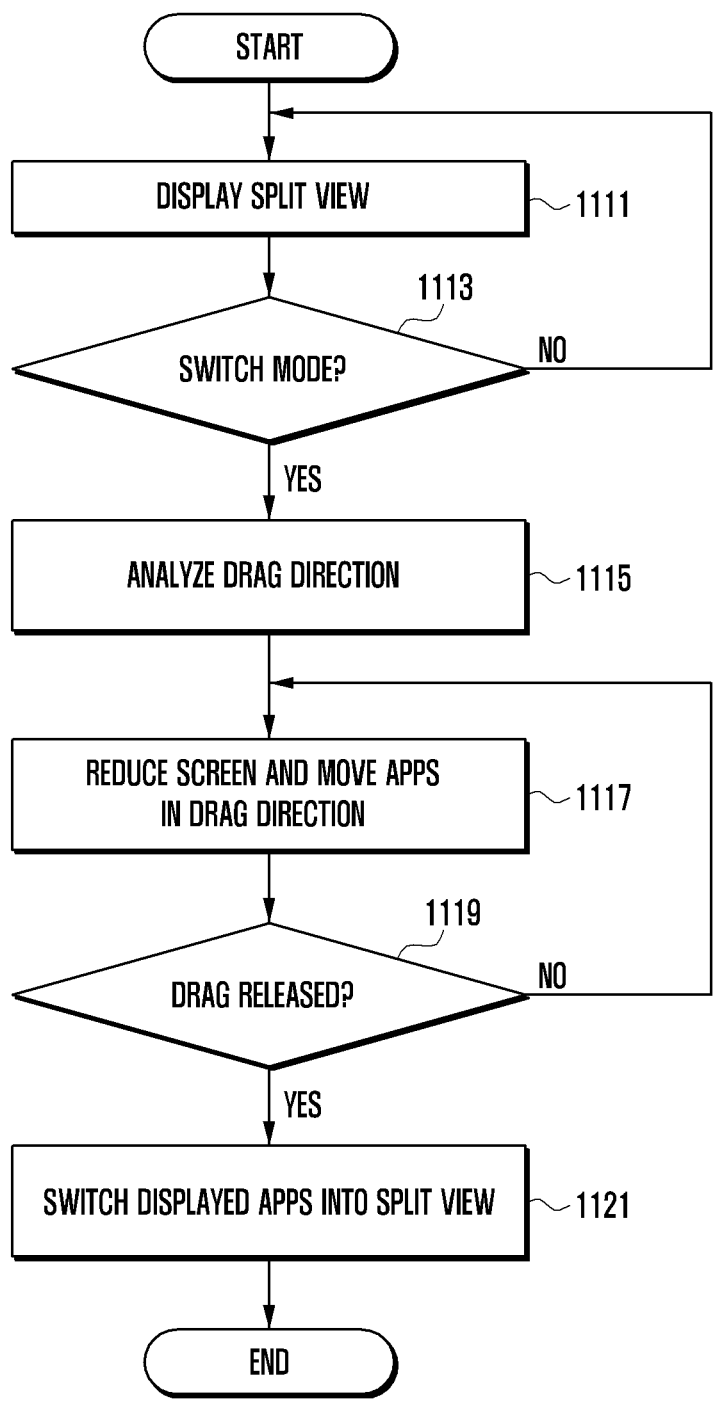
FIG. 11 is a flowchart illustrating a method of selecting and switching a switch App while moving Apps according to an exemplary embodiment of the present invention.
Figure 12:
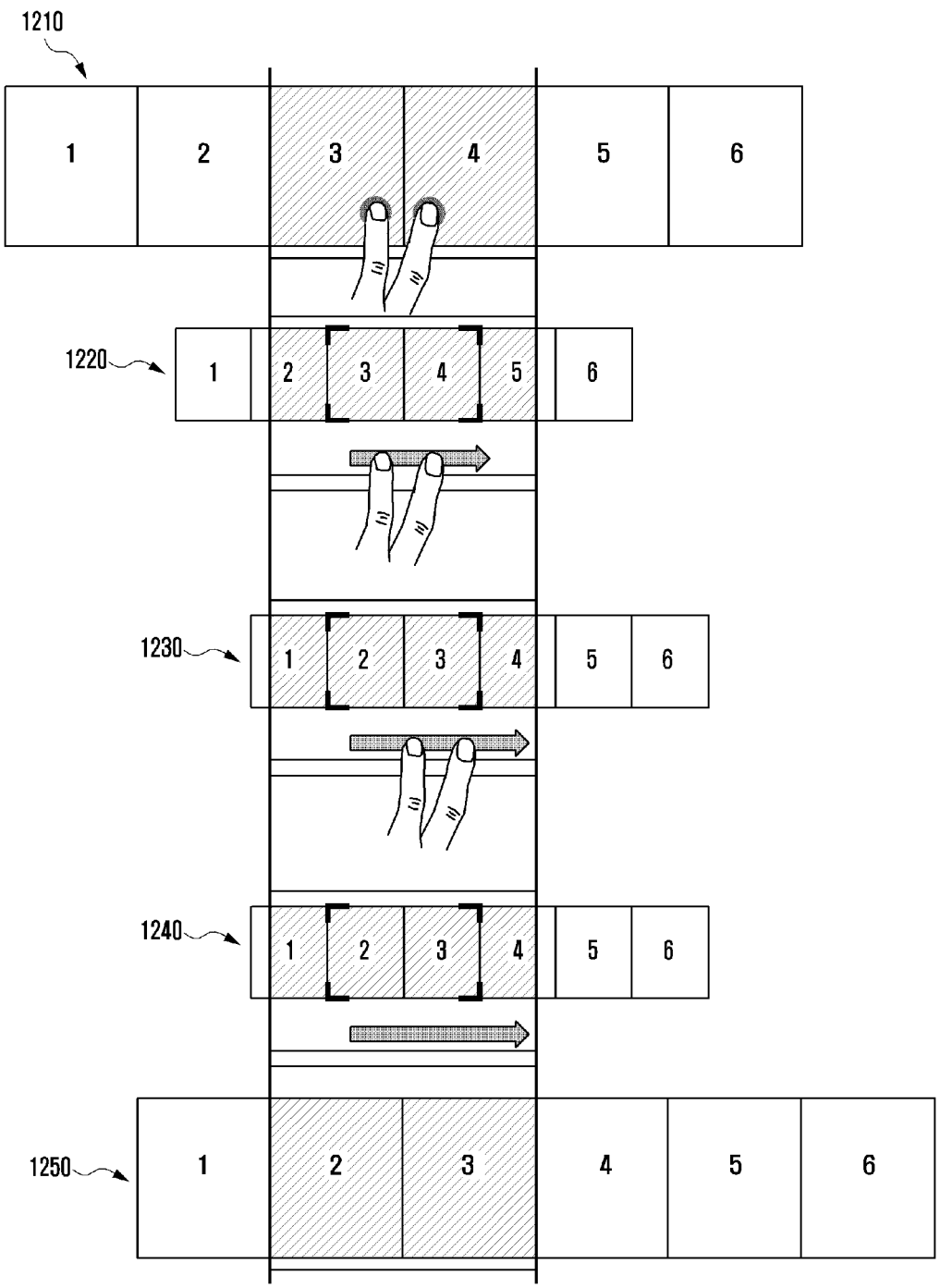
FIG. 12 is a diagram illustrating an example of switching an application while performing the method of FIG. 11.

FIG. 11 is a flowchart illustrating a method of selecting and switching a switch App while moving Apps according to one exemplary embodiment of the present invention. FIG. 12 is a diagram illustrating an example of switching an application while performing the method of FIG. 11.

Referring to FIGS. 11 and 12, the controller 100 initially displays a split view (step 1111). When the user generates an input of a switch mode in a state that the split view is displayed, the controller 100 may detect a switch mode (step 1113). The switch mode is a mode for selecting switch Apps while moving Apps. The above switch mode may be set by an operation of dragging and moving Apps in order to enter a switch mode by a long tap and to select the switch App. For example, if a long tap is generated as illustrated at 1210 of FIG. 12, the controller 100 detects the switch mode and reduces the size of the Apps shown and displays a screen 1220 (step 1113). The controller 100 analyzes a drag direction (step 1115) and moves the list of Apps in a drag direction as illustrated in 1220, 1230, and 1240 of FIG. 12 (step 1117). The controller 100 then displays the list of displayed Apps and candidate Apps (i.e., Apps which can be switched, for example application 2 and 3) among moved Apps capable of being displayed as a split view as illustrated in 1220, 1230, and 1240 of FIG. 12. More particularly, the controller 100 displays Apps located at a center of the display unit 130 among candidate Apps. In order to display an App to be switched among displayed Apps, the user releases (drops) a drag. Accordingly, if the user releases the drag, the controller 100 detects it (step 1119), and displays selected Apps (Apps 2 and 3 in a case of FIG. 12 as illustrated in 1250 of FIG. 12) (step 1121).

As shown in FIG. 12, a user long taps to enter a mode by a multi-finger (at least two fingers) and moves the multi-finger to move and switch a desired App. If the user then releases the multi-finger which performs long tap, the App is switched to an App located at a view region to release the mode.

Although not shown, a switch method between Apps in a screen may be used. In this case, a switch operation between neighboring left and right Apps in the landscape mode may be performed. That is, when a 1/N Split view in a screen is switched, the user can select an App region by a single finger to rotate 180°. The foregoing method may be performed between neighboring up and down Apps in a portrait mode.

As herein described, the present invention may display an application selected by a user and change applications displayed on a split view to switchable candidate application in a state that a plurality of applications are displayed on the split view in the portable terminal lay-outing and displaying a plurality of split views on one layer. In this case, the switch method of the application may select an App to be changed, and move and switch the selected App. Further, one or more applications may be switched once.

In this case, an application of a switch target may include all Apps, a recent App or a running App in the portable terminal. The switch method may be performed using single and/or multi finger selections, a pen, or the pen and the single and multi-finger. The foregoing embodiment has illustrated that the application switch method selects and switches Apps to be changed by each single finger in order to switch at least two applications, and selects and switches an App to be changed by a multi-finger (at least two fingers) in order to switch one application. However, the foregoing switch method may be performed through other touch interaction (using only a single finger, only a multi-finger, only a pen, or both of the finger and the pen).

In a multi-window of the portable terminal, an application may be efficiently switched while maintaining a state of a split view in which a plurality of split views (1/N Split window) are aligned. Due to this, burden and complexity with respect to an operation for switching an application can be minimized and the application can be naturally switched seamless.

The above-described methods according to the present invention can be implemented in hardware, firmware or via the execution of software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A method of displaying a view in a portable terminal, the method comprising:

displaying in an application switch mode a plurality of applications undergoing execution in a split view display region of a display in which the split view is apportioned according to a quantity of the plurality of applications undergoing execution that are designated for display;

entering a switch mode controlled by a controller to switch a display of one of the plurality of applications undergoing execution with a selected switchable candidate application in response to a received request and additionally displaying a plurality of switchable candidate applications in the display that are retrieved from memory when the portable terminal is in the switch mode;

reducing a displayed size of the applications undergoing execution in the split view region when additionally displaying the plurality of switchable candidate applications in the display; displaying a selected switchable candidate application in place of one of the plurality of applications undergoing execution that is displayed in the split view display region by moving display of the one of the plurality of applications being executed to a display position at which the selected switchable candidate application was displayed prior to selection; and enlarging and displaying the split view without displaying the plurality of switchable candidate applications when the switch mode is terminated, wherein the switch mode is detected by the controller as a pinch close operation through an action using multiple fingers, wherein the application is detected by the controller as an action dragging the candidate application to drop the application from the split view, and wherein the application displayed as the split view is moved to a position of the candidate application.

2. The method of claim 1, wherein the enlarging and displaying the split view is performed following a pinch open operation.

3. An apparatus for displaying a view in a portable terminal, the apparatus comprising:

a display that provides a visual output displays a plurality of applications being executed as a split view in a split display region of the display in which the split view is apportioned according to a quantity of the plurality of applications undergoing execution that are designated for display;

a touchscreen input that detects touch associated with requesting a switch mode and in response generates a switch mode signal and an application selection signal; and a controller that receives the switch mode signal and application selection signal from the touchscreen input, and the controller includes a microprocessor configured to perform an application switch operation by swapping one of the plurality of applications being executed from the split view with a switchable candidate application following a touch interaction when the switch mode is detected, and displaying a at least one candidate application on the display, wherein the controller reduces the split view in the switch mode to display a reduced-size split view of applications being executed and additionally display the candidate applications, and in response to selection of one of the candidate applications to perform the application switch application, swapping a display in the split view of one of the applications being executed with the selected candidate application, and moving display of one of the applications being executed from the split view to a corresponding position of a position being vacated by the selected candidate application, wherein the controller detects the switch mode following a multi-finger pinch close operation gesture, and wherein the controller moves the candidate application according to a drag signal, and displays a selected application on a split view of in a position at which the drag signal is terminated.

4. The apparatus of claim 3, wherein the controller enlarges the reduced split view to terminate the switch operation when a pinch open is detected.

* * * * *